Figure 1:
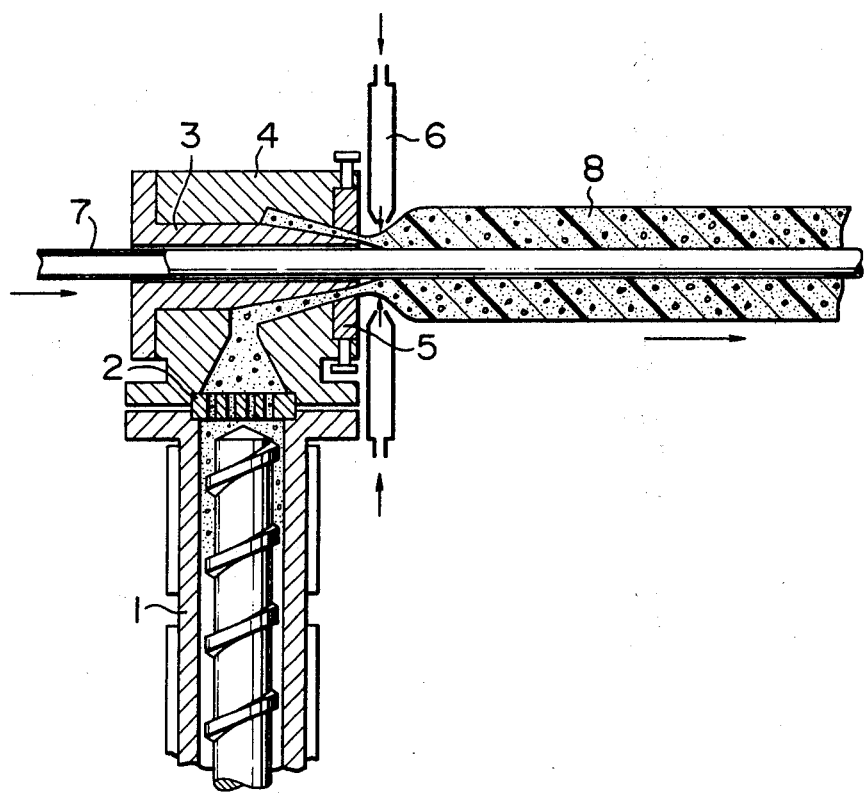

United States Patent [19]

Fukushima et al.

[11] 4,146,562
[45] Mar. 27, 1979

[54] EXTRUSION COATING METHOD WITH POLYOLEFIN FOAM

[75] Inventors: Nobuo Fukushima, Ootsu; Takayoshi Adachi, Nishinomiya; Nobuyuki Takahashi, Toyonaka; Kazuaki Sakakura, Moriguchi, all of Japan

[73] Assignee: Sumitomo Chemical Company, Limited, Osaka, Japan

[21] Appl. No.: 808,385

[22] Filed: Jun. 20, 1977

[30] Foreign Application Priority Data

Jun. 22, 1976 [JP] Japan ................................. 51-74061
Aug. 27, 1976 [JP] Japan ................................ 51-103032

[51] Int. Cl.$^2$ ............................................ B29D 27/00
[52] U.S. Cl. .................................. 264/45.5; 264/45.9; 264/173; 264/DIG. 5; 264/DIG. 14
[58] Field of Search .................. 264/45.9, 46.1, 46.7, 264/46.9, 45.5, DIG. 14, 173, DIG. 5

[56] References Cited

U.S. PATENT DOCUMENTS

| | | | |
|---|---|---|---|
| 2,994,327 | 8/1961 | Otto et al. | 264/45.9 X |
| 3,029,476 | 4/1962 | Merck et al. | 264/46.7 X |
| 3,030,623 | 4/1962 | Lehti et al. | 264/46.7 X |
| 3,222,722 | 12/1965 | Reifenhauser | 264/46.7 X |
| 3,528,458 | 9/1970 | Gaeckel | 264/45.9 X |
| 3,764,642 | 10/1973 | Boutillier | 264/45.5 |
| 3,790,436 | 2/1974 | Graham et al. | 264/45.5 X |
| 3,860,686 | 1/1975 | Myers | 264/45.9 X |
| 3,922,328 | 11/1975 | Johnson | 264/46.1 |

FOREIGN PATENT DOCUMENTS

| | | | |
|---|---|---|---|
| 241564 | 3/1960 | Australia | 264/46.9 |
| 2420608 | 11/1975 | Fed. Rep. of Germany | 264/45.9 |
| 2033555 | 12/1970 | France | 264/46.1 |
| 48-4869 | 2/1973 | Japan | 264/45.9 |
| 1217729 | 12/1970 | United Kingdom | 264/46.1 |

OTHER PUBLICATIONS

"Wire and Cable Coaters' Handbook" First Edition, Wilmington, Del., E. I. Du Pont de Nemours and Co., Inc., ©1968, pp. 18-23.

*Primary Examiner*—Philip Anderson
*Attorney, Agent, or Firm*—Cushman, Darby & Cushman

[57] ABSTRACT

Disclosed is a method for continuous extrusion coating of a hollow core material with a highly expanded polyolefin resin, which is characterized by subjecting an extruded molten mass of an expandable polyolefin resin to external cooling at the point at which said molten mass begins to foam and supplying said hollow core material with the surface temperature thereof kept below the softening point of said polyolefin resin for thereby enhancing the fastness of adhesion of the highly expanded polyolefin foam with the hollow core material and at the same time facilitating the release of the two materials thus joined.

6 Claims, 2 Drawing Figures

EXTRUSION COATING METHOD WITH POLYOLEFIN FOAM

This invention relates generally to a method for the continuous extrusion coating of a hollow core material with a polyolefin foam, and particularly to a method for the continuously extrusion coating of a hollow core material in a state wherein said hollow core material and a polyolefin foam expanded to a high ratio (more than three times) are joined fast with each other.

More particularly, the present invention has two versions as summarized herein below.

Firstly, the invention relates to a method for the continuous extrusion coating of a hollow core material with a highly expanded polyolefin foam by a continuous extrusion foaming by means of a volatile organic solvent by use of a coating die, which method comprises causing the molten mass of said expandable polyolefin extruded through the coating die to be cooled on the surface at the point at which said molten mass begins to foam, allowing the pressure of foaming to be exerted inwardly and causing the growth of foam to proceed in the direction of the internal core for thereby enabling the polyolefin foam to adhere fast to the hollow core and giving rise to a coating of smooth surface condition.

Secondly, the invention relates to a method for the continuous extrusion coating of a hollow core material with a highly expanded polyolefin foam, which method comprises keeping the surface temperature of the hollow core material being continuously supplied at a level below the softening point of the molten mass of the expandable polyolefin resin being extruded through the coating die for thereby allowing a uniform skin layer to be formed of said polyolefin resin along the interface between the core material and the molten mass when they are brought into mutual contact, whereby said uniform skin layer maintains fast adhesion of the foamed coating to the core material and yet permits ready release of the foamed coating from the core material such as when the core material is set in position finally for intended service.

Conventional hollow core materials coated with foamed plastics enjoy thermal insulation, lightness of weight and waterproofness. Particularly pipes coated with highly expanded foams such as of polyethylene, polyurethane, etc. are characterized by possessing excellent thermal insulation and ability to permit practical applications without requiring any advanced technique or skill. Because of the advantageous properties, these pipes are extensively used for hot water systems, city water systems, air conditioning systems and fuel distribution systems in residences, hotels, hospitals, multi-story buildings, and the like. However, these highly expanded plastic foams are invariably torn open along a longitudinally inserted slit after they have been formed as if they are deposited in the form of tubes round core pipes and, when the core pipes are put to use in the site of installation, the torn tubes of plastic foams are closed up again tightly round the core pipes. The finishing of these coated pipes, therefore, inevitably requires the jobs of taping and coating. Moreover, these pipes have a disadvantage that they suffer from inferior field workability and inefficient plumbing operation in spaces of limited dimensions. As a measure for the continuous manufacture of metallic or plastic pipes and electric wires coated with foamed plastics, there has been known the continuous integral coating method whereby the core materials are coated at the same time that the plastics are extrusion foamed. According to this method, the extrusion coating with the foam of a polyolefin having low expandability can be carried out as effectively as with a non-expandable plastic substance, without any difficulty. In the case where the extrusion coating of a given core material by this method is carried out with the foam of a polyolefin which possesses an expansion ratio of 3 or more and is suited advantageously to uses as a thermal insulator, a shock absorber or a noise absorber, when the polyolefin resin containing a volatile foaming agent therein is extruded through the coating die into the atmosphere and therefore is caused to undergo foaming the tubular polyolefin foam which consequently occurs around the core material is inflated in both inside diameter and outside diameter. As the result, the inside diameter of the tubular polyolefin foam becomes greater than the outside diameter of the core material. This means that a gap is suffered to intervene between the core material and the polyolefin foam coating and thus prevent them from forming fast adhesion.

The method adopted as above has the inevitable disadvantage that the core material is left to slide freely within the polyolefin foam coating, the polyolefin foam coating forms an uneven outer surface and the characteristic feature, i.e. thermal insulation, of the hollow core material covered with the foamed coating is degraded.

Intimate adhesion of the polyolefin foam coating to the hollow core material, therefore, is an indispensable requirement for the elimination of these disadvantages. In this respect, there have been proposed methods for forced establishment of tight adhesion between the core material and the foamed coating such as, for example, a method whereby the intimate adhesion of the core material and the foamed coating is effected by reducing the internal pressure of the gap occurring therebetween (Japanese Patent Publication No. 4869/1973), a method whereby the intimate adhesion is obtained by releasing excess foaming gas from the interspace occurring between the core material and the foamed coating (Japanese Patent Publication No. 24577/1974) and a method whereby intimate adhesion between the core material and the foamed coating is ensured by application of an adhesive agent to the surface of the core material.

These methods invariably necessitate use of special dies. In the case of a product obtained by effecting the forced adhesive agent, since the core material and the foamed coating are joined strongly to each other, partial removal of the foamed coating from the core material which is frequently found necessary for the purpose of directly joining two core materials at the site of field work cannot easily be accomplished but calls for much time and labor. Even after the removal, some of the coating persists on the surface of the core material and impedes perfect union of the two core materials. Particularly when the core material happens to be a metal pipe or metal wire, since such joining is obtained by welding, soldering or other similar treatment, imperfect removal of the foamed coating may possibly entail defective union.

The inventors made a devoted study in search of a method which is free from such drawbacks and which enables a highly expanded polyolefin foam and a hollow core material to be brought into fast mutual adhesion simply by use of an ordinary coating die. They have consequently made the discovery that the fastness of adhesion between the polyolefin foam and the hollow core material depends on the extent to which the extruded polyolefin resin containing the volatile foaming agent is cooled and on the quality, particularly dependence of melt viscosity on temperature, which the polyolefin resin containing the volatile foaming agent possesses and also that the surface temperature which the hollow core material has at the time the expandable polyolefin resin is brought into contact with the hollow core material constitutes a critically important factor governing the ease with which the foamed coating is release from the hollow core material. They have ascertained that fast adhesion between the highly expanded polyolefin foam and the hollow core material is successfully attained by carrying out a continuous extrusion coating with these factors coordinated to the optimum combination.

To be specific, this invention relates to a method for the continuous extrusion coating of a hollow core material with a highly expanded polyolefin foam by continuous extrusion foaming by means of a volatile organic solvent by use of a coating die. The method comprises causing the molten mass of said expandable polyolefin extruded through the coating die to be cooled on the surface at the point at which said molten mass begins to foam, allowing the pressure of foaming to be exerted inwardly and causing the growth of foam to proceed in the direction of the internal core for thereby enabling the polyolefin foam to adhere fast to the hollow core and giving rise to a coating of smooth surface condition. Furthermore, the method comprises keeping the surface temperature of the hollow core material being continuously supplied at a level below the softening point of the molten mass of the expandable polyolefin resin being extruded through the coating die for thereby allowing a uniform skin layer to be formed of said polyolefin resin along the interface between the core material and the molten mass when they are brought into mutual contact, whereby said uniform skin layer maintains fast adhesion of the foamed coating to the core material and yet permits ready release of the foamed coating from the core material.

One of the requirements for fast adhesion between the highly expanded polyolefin foam and the hollow core material contemplated by the present invention, namely the cooling of the surface of the molten resin of the expandable polyolefin containing the volatile foaming agent extruded through the coating die, has its origin in the inventors experience with the manufacture of a highly expanded polyolefin pipe by the continuous extrusion foaming by means of a volatile organic solvent, which has led them to the knowledge that, when the cooling of the surface of said molten resin is started at the point at which the extruded molten resin of expandable polyolefin begins to foam, the melt viscosity in the surface layer of said molten resin sharply increases owing to the cooling to give rise to a skin layer on the surface and consequently produce a smooth surface. The outward inflation of the foam is also inhibited and the growth of the foam is allowed to proceed in the direction of the center of the core material, with the result that the inward inflation of the foam is accelerated and the inside diameter of the highly expanded polyolefin pipe is decreased.

It has been established that desired fast adhesion of the highly expanded polyolefin foam and the hollow core material is successfully attained when the phenomenon thus learnt through experience is applied to the continuous extrusion coating of the hollow core material with the highly expanded polyolefin foam effected by the continuous extrusion foaming by means of a volatile organic solvent, so that the pressure of foam is caused to be exerted in the direction of the hollow core material and the expanding foam eventually is wrapped up tightly around the hollow core material. The present invention also provides fast adhesion between the polyolefin foam and the hollow core material and yet permits ready release of the foamed coating from the hollow core material when the release is found necessary such as in the field works involving use of the finished products. This technical achievement is wholly ascribable to the fact that a uniform skin layer of said polyolefin resin is formed along the interface between the hollow core material and the polyolefin foam when the molten resin of the expandable polyolefin extruded through the die is caused, before it begins to inflate because of foaming, to come into contact with the hollow core material whose surface temperature is kept at a level below the softening point of said polyolefin resin. Specifically, the skin layer of the polyolefin foam occurs because the corresponding surface portion of the polyolefin foam is suddenly cooled and otherwise possible foaming of the resin in said surface portion is inhibited owing to local loss of heat. In the case of the method by this invention, such a skin layer is formed in the inner surface portion of the polyolefin foam because said surface portion of the polyolefin foam is suddenly cooled when the molten resin of said expandable polyolefin extruded through the die is brought into contact with the hollow core material being supplied with the surface temperature thereof kept below the softening point of said polyolefin resin.

The formation of said skin layer on the inner surface coupled with the effect of the inward exertion of the pressure of foaming brought about by the surface cooling provides effective inhibition of the inflation, so that the foamed layer assumes a structure wherein it is held in fast adhesion with the hollow core material through the medium of the non-foamed skin layer. In the finished product, the hollow core material is not suffered to slide freely within the foamed coating. When the foamed coating is desired to be removed from the core material, since ready release is obtained along the interface between the skin layer and the hollow core material, the bare skin of the hollow core material can be completely exposed. Where the hollow core material happens to be a metallic pipe, therefore, welding, soldering and other forms of joining of two or more materials can be carried out rapidly and safely in the field work involving use of the finished core materials. Here, the requirement that the surface temperature of the hollow core material being supplied should be kept at a level lower than the softening point of the expandable polyolefin resin in the molten mix consisting of said expandable polyolefin resin and the volatile foaming agent is based on the following reason.

Generally in the integral extrusion coating, as a measure for improving the fastness of adhesion, there is adopted a method wherein the core material being supplied is heated in order that the elevated temperature of the surface ensures intimate union of the core material with the surface extruded molten resin. In the case where the extrusion coating is effected with a foam of high expansion ratio as in the present invention, if the surface temperature of the hollow core material being supplied is higher than the softening point of said expandable polyolefin resin, then the foaming proceeds also in the surface portion of the polyethylene foam which comes into contact with the hollow core material. If the hollow core material happens to be a flexible pipe made of a plastic material, then the hollow core tends to be deformed by the pressure of foaming which is caused to be exerted inwardly. Further, since strong adhesion occurs in the interface between the foam layer and the hollow core material, the field work involving use of finished products tends to entail a disadvantage that the foam layer will not readily come off the surface of the hollow core material.

In the present invention, therefore, the surface temperature of the hollow core material being supplied is kept at a level below the softening point of the expandable polyolefin resin so that the skin layer formed along the interface between said expandable polyolefin resin and the hollow core material will provide fast adhesion therebetween and, at the same time, give a solution to the problem mentioned above.

The thickness of the skin layer thus formed is determined by the thickness of the expandable polyolefin resin from the surface on which said resin is cooled for the purpose of inhibiting the foaming. Generally, the thickness of the skin layer so formed increases with the decreasing surface temperature of the hollow core material. It is, therefore, desirable that the surface temperature of the hollow core material being supplied should be suitably selected in the range below the softening point of the expandable polyolefin resin by taking into due consideration a particular specification of the coated product such as, for example, the magnitude of curvature appropriate for the intended bending work.

The polyolefin resins which are usable for the present invention include crystalline polyolefin resins such as of low-density polyethylene, high-density polyethylene, polypropylene and polybutene-1, the resins of copolymers thereof and mixtures of two or more of such copolymer resins. From the standpoint of foamability, low-density polyethylenes and mixtures of low-density polyethylenes with high-density polyethylenes are advantageous. Particularly, a mixture consisting of from 30 to 90% by weight of a low-density polyethylene having a density of not more than 0.930 g/cm$^3$ and from 70 to 10% by weight of a high-density polyethylene having a density of not less than 0.940 g/cm$^3$ is advantageous for the following reason: When the cooling of the surface of the molten mixed polyethylene resin is started at the point at which the resin begins to foam, the melt viscosity in the surface layer of the molten resin rises so abruptly that the resulting mixed polyethylene foam is inhibited from attaining outward inflation, the pressure of foaming is caused to be exerted inwardly and the growth of foam is made to proceed in the direction of the center of the core material, with the overall result that the inflation of the foam tends to be accelerated inwardly to enhance the fastness of the adhesion of the foam with the hollow core material held inside.

The coolants which are used advantageously for the cooling involved in the present invention are air, water, and various kinds of gases. The surface of the resin foam is cooled by airing or directing a cooling gas or water against the surface or by use of a water bath, for example.

The hollow core materials which are advantageously usable for the coating by the method of this invention are those hollow bodies made of metallic or plastic materials and used for distribution of hot water and steam in the hot-water supply system, space heating system and centralized heating system, for supply of city water, for distribution of coolants in the space cooling system and refrigeraton system and for supply of fuel. The cross-sectional shape of the hollow core material is not critical insofar as the finished product obtained after the extrusion coating has a simple cross-sectional shape such as a circle or square.

As the volatile foaming agent for said polyolefins, there can be used any of the various volatile foaming agents which are generally accepted as useful in the continuous extrusion foaming by means of a volatile organic solvent. Examples of the volatile foaming agents which can be used include low boiling point aliphatic hydrocarbons such as propane, butane, pentane and hexane, halogenated hydrocarbons such as dichlorodifluoromethane, 1,2-dichlorotetrafluoroethane and monochlorodifluoromethane and mixtures of two or more of such hydrocarbons.

As the coating die, there can be used any of the crosshead type coating dies designed for die interior joining and die exterior joining.

Figure 2:
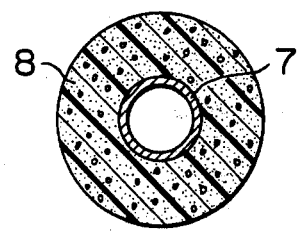

The invention will be understood best in connection with the drawings wherein:

FIG. 1 is a sectional view showing the cooling of the foam as it leaves the extruder, and FIG. 2 is a cross sectional view of a hollow pipe core having a foam coating.

One preferred embodiment of the continuous extrusion coating of a core material with a polyethylene foam of a high expansion ratio by the method of the present invention will be described below with reference to FIG. 1. A mixture of two kinds of polyethylenes and a foaming aid is supplied to the first extruder which is not shown in the drawing. At the portion of the extruder interior at which said mixture is being melted, a gaseous blowing or foaming agent in a liquified or compressed state is injected via an inlet bored through the cylinder barrel of the extruder to be mixed substantially uniformly with the molten mixture. Within the second extruder 1, the mixture is adjusted in temperature so as to assume a proper viscosity for foaming. Then the mixture of a controlled temperature is forced through a breaker plate 2 into a cross-head die for coating. The cross-head die is broadly divided into an inside mandrel 3, outside mandrel 4 and an adjusting ring 5. The mixture now containing the foaming agent is extruded through the gap formed among the inside mandrel 3, the outside mandrel 4 and the adjusting ring 5.

In the meantime, a hollow core material 7 which is depicted as a pipe in the drawing is supplied to the inside mandrel through the void thereof in the same direction as that of the flow of the molten resin. As the mixture containing the foaming agent is extruded into the atmospheric pressure, the foaming agent is abruptly vaporized by the agency of the foaming aid to initiate the foaming of the mixture. At this point, cooling air is blown against the outer boundary of the foam through a cooling air ring 6 disposed adjacent the discharge outlet of the die, to cool the surface of the polyethylene foam and consequently inhibit outward inflation and accelerated inward inflation of the polyethylene foam 8. Thus, fast adhesion is established between the hollow core material 7 and the highly expanded polyethylene foam 8 having an expansion ratio of not less than 3.

The polyethylene foam-coated material obtained by the present invention (as shown in FIG. 2) has a hollow core material coated with a polyethylene foam of a high expansion ratio deposited to a uniform thickness in fast adhesion with the surface of said core material. Thus, the foamed coating has a smooth surface and keeps firm hold of the hollow core material so that said core material is not left to slide freely inside the coating.

Further in the preferred embodiment described above, the hollow core material is supplied with its surface temperature kept at a level below the softening point of the expandable polyethylene resin and the application of the molten polyethylene resin to the hollow core material is effected within the die interior, with the result that a skin layer of a uniform thickness is formed of said polyethylene resin along the interface between the polyethylene foam and the hollow core material. The polyethylene foam-coated material thus produced, therefore, enjoys fast adhesion between the foam and the core and provides ready release of the foamed coating from the core material when the separation is found necessary in the field work involving use of the finished product.

To summarize the advantages of the present invention, the usefulness of the invention is recognized in numerous respects as shown below.

As the molten polyolefin resin is extruded through the die, the cooling of the surface of the extruded molten resin is started at the pont at which the molten resin begins to foam so as to heighten abruptly the melt viscosity of the surface portion of the molten resin, inhibit outward inflation of the resin, cause the pressure of foaming to be exerted inwardly and enable the growth of foam to proceed in the direction of the center of the hollow core material. The advantages derived from the surface cooling are:

(1) The foamed coating is permitted to adhere with the hollow core material with ample fastness, without reference to the degree of expandability of the polyolefin resin and the thickness of the layer formed of the foam.

(2) The foamed coating has a smooth surface without reference to the degree of expandability of the polyolefin resin used.

(3) Since the foamed coating has such a smooth surface, application of an additional coating to the surface and other similar treatments can be effected with great ease.

The hollow core material is supplied to the die with its surface temperature kept at a level below the softening point of the expandable polyolefin resin which is extruded through the die, so as to give rise to a skin layer of said polyolefin resin along the interface between the molten polyolefin resin and the hollow core material.

The advantages derived from the formation of such a skin layer include:

(4) The foamed coating and the hollow core material can be held in tight immovable union with absolutely no stickiness, so that desired release of the foamed coating from the hollow core material can be obtained with great ease.

(5) The ease of the release of the foamed coating contributes greatly to lessening the work burden and ensuring the safety in the field work involving use of the finished product.

(6) Even if the hollow core material happens to be made of a flexible substance, the pressure of foaming will not cause deformation in the core material.

Now the present invention will be described with reference to working examples, which are purely illustrative of and not limitative in the least of the invention. The invention can be suitably modified without departing from the spirit of the invention.

EXAMPLE 1

In a kneading extruder (50 mm in barrel interior diameter, L/D = 24), a mixture consisting of 70% by weight of a pelletized polypropylene having a density of 0.91 g/cm$^3$ and a melt index of 2.0 and 30% by weight of a pelletized polybutene-1 having a density of 0.905 g/cm$^3$ and a melt index of 2.0 was kneaded at 180° C. to produce a substantially homogeneous mixture. With 100 parts of the mixture were dry blended 0.5 part by weight of sodium bicarbonate and 0.4 part by weight of citric acid as nucleus-forming agents serving to control the size of individual cells of the foam. Consequently, there was obtained a compound for extrusion foaming.

The extrusion foam coating system adopted consisted of two extruders and a cross-head die, with the leading end of the first extruder (50 mm in barrel interior diameter, L/D = 23) joined into the rear end of the second extruder (40 mm in barrel interior diameter, L/D = 20). The second extruder was provided at the leading end thereof with a coating cross-head die like the one illustrated in FIG. 1. Said compound was fed to the first extruder kept at 180° C. at a feed rate of 7.2 kg/hour. At the portion of the extruder interior at which the compound was melted and kneaded, dichlorodifluoromethane compressed to a pressure of 130 kg/cm$^2$ was injected as a foaming agent via an inlet bored through the cylinder barrel of the extruder at a rate of 0.52 kg/hour. The mixture emanating from the first extruder was fed to the second extruder, then adjusted to a temperature of 148° C. and extruded through the cross-head die. Through the cavity in the inside mandrel of the cross-head die, a copper pipe ½ inch (15.88 mm in outside diameter) was supplied at a rate of 1 mm/min. in the same direction as that of the extrusion of the mixture. The mixture was forced through the annular gap formed between the inside mandrel 20 mm in outside diameter and the adjusting ring 24 mm in inside diameter into the atmosphere. Upon exposure to the atmospheric pressure, the mixture began to foam. At this point, cooling air kept at 15° C. was blown against the outer boundary of the extruded molten mixture through of the die as illustrated in FIG. 1, so as to inhibit outward inflation and accelerate inward inflation of the foam and produce a foamed coating on the copper pipe.

The polyolefin foam-coated pipe thus obtained in an outside diameter of 28 mm had the polyolefin foam coating held fast against the copper pipe and possessed a smooth surface. The polyolefin foam coating represented an expansion ratio of 4.5 and was shown to possess relatively high rigidity and high thermal resistance.

EXAMPLE 2

With 100 parts of a mixture obtained by dry blending 70% by weight of pelletized polyethylene having a density of 0.921 g/cm$^3$ and a melt index of 2.0 with 70% by weight of pelletized polyethylene having a density of 0.967 g/cm$^3$ and a melt index of 5.7, 0.5 part by weight of sodium bicarbonate and 0.4 part by weight of citric acid serving to control the size of individual cells of the foam were dry blended. Consequently, there was obtained a compound for extrusion foaming. The extrusion foam coating system adopted consisted of two extruders and one cross-head die. The leading end of the first extruder (50 mm in barrel interior diameter, L/D = 23) was joined into the rear end of the second extruder (40 mm in barrel interior diameter, L/D = 20). The leading end of the second extruder was fitted with a coating cross-head die as illustrated in FIG. 1. To the first extruder kept at 160° C., said polyethylene mixture was fed at a rate of 6.5 kg/hour. At the portion of the extruder interior at which the mixture was melted and kneaded, dichlorodifluoromethane compressed to a pressure of 110 kg/cm$^2$ was injected as a foaming agent via an inlet bored through the cylinder barrel of the extruder at a rate of 0.52 kg/hour. The resultant mixture was fed to the second extruder, adjusted to a temperature of 130° C. and forced out of the cross-head die. Through the cavity in the inside mandrel of the cross-head die, a copper pipe ½ inch (15.88 mm in outside diameter) was supplied at a rate of 1 m/min. in the same direction as the extrusion of the mixture. The mixture was extruded through an annular gap formed between the inside mandrel 20 mm in outside diameter and the adjusting ring 24 mm in inside diameter into the atmosphere. Upon exposure to the atmospheric pressure, the molten mixture began to foam. At this point, cooling air kept at 15° C. was blown against the outer boundary of the extruded molten mixture through a cooling air ring disposed adjacent the outlet of the die as shown in FIG. 1, so as to inhibit outward inflation and accelerate inward inflation of the polyethylene foam and produce a foamed coating on the copper pipe.

The polyethylene foam-coated pipe thus obtained in an outside diameter of 32 mm had the polyethylene foam coating held fast against the copper pipe and possessed a smooth surface. The polyethylene foam coating represented an expansion ratio of 6.5 and was shown to possess relatively high rigidity and high thermal resistance.

EXAMPLE 3

The extrusion foaming system used in Example 1 was fitted with a cross-head type coating die designed for inner joining. In a super mixer, 100 parts by weight of a low-density polyethylene having a density of 0.921 g/cm$^3$, a melt index of 2.0 and a Vicat softening point of 92° C. was mixed with 0.5 part of weight of sodium bicarbonate and 0.4 part by weight of citric acid both serving as nucleus-forming agents.

The resultant mixture was fed to the first extruder kept at 155° C. at a feed rate of 7.0 kg/hour. Through the inlet for the foaming agent, dichlorodifluoromethane compressed in advance to a pressure of 100 kg/cm$^2$ with a reciprocating pump was fed at a rate of 1.0 kg/hour. The mixture discharged in a molten plasticized form from the first extruder was led through a connecting tube into the second extruder with the pressure adjusted to about 40 kg/cm$^2$ by control of the revolution number of the screw of the second extruder. The mixture was adjusted to 103° C. and extruded via the coating die. Through the cavity in the inside mandrel of the cross-head coating die, a copper pipe 8 mm in outside diameter kept at 15° C. of surface temperature was supplied at a rate of 2 m/min. in the same direction as the extrusion of the mixture.

The mixture was applied to the copper pipe in the die interior 5 mm inwardly from the discharge outlet of the die. The mixture and the pipe were extruded in an integrally joined form through the discharge outlet of the die 11 mm in outside diameter into the atmosphere. Upon exposure to the atmospheric pressure, the mixture on the pipe began to foam.

At this point, cooling air kept at 20° C. was blown against the outer boundary of the foam through a slit of the air ring 70 mm in diameter disposed adjacent the discharge outlet of the die, to inhibit outward inflation and accelerate inward inflation of the polyethylene foam and ensure uniform union between the copper pipe and the polyethylene foam coating. Consequently, there was obtained a polyethylene foam-coated pipe.

The polyethylene foam-coated pipe thus produced was found to possess a uniform skin layer 0.1 mm in thickness along the interface between the copper pipe and the foamed coating. The polyethylene foam having a density of 0.08 g/cm$^3$ (representing an expansion ratio of 11.5) and a coating thickness of 10 mm was found to be held in tight contact with the copper pipe through the medium of said skin layer. When a cut was inserted with a knife in the coating layer of the polyethylene foam-coated pipe throughout the entire depth and one portion of the coating layer was pulled off the copper pipe, it was removed very easily and absolutely no part of the foamed resin was seen to remain sticking to the surface of the copper pipe. Thus, the pipe was shown to enjoy high workability.

EXAMPLE 4

The extrusion foaming system used in Example 1 was fitted with a cross-head type coating die designed for inner joining. In a super mixer, 100 parts by weight of a mixture (having a Vicat softening point of 117.5° C.) obtained by dry blending 70% by weight of a low-density polyethylene having a melt index of 2.0 g/10 minutes, a specific gravity of 0.921 and a Vicat softening point of 92° C. and 30% by weight of a high-density polyethylene having a melt index of 5.7 g/10 minutes, a specific gravity of 0.467 and a Vicat softening point of 127° C. was mixed with 0.5 part by weight of sodium bicarbonate and 0.4 part by weight of citric acid both serving as nucleus-forming agents.

The resulting mixture was fed at a feed rate of 7.2 kg/hour to the first extruder fixed at 170° C. Via the inlet for introduction of the foaming agent, a mixture of dichlorodifluoromethane with trichlorofluoromethane (mixing ratio at 7:3) compressed in advance to a pressure of 110 kg/cm$^2$ with a reciprocating pump was fed at a ratio of 0.8 kg/hour. The mixture discharged in a molten plasticized form from the first extruder was led through a connecting tube into the second extruder with the pressure adjusted to about 40 kg/cm$^2$ through control of the revolution number of the screw. Then the mixture was adjusted to 130° C. and forced out of the cross-head coating die designed for inner joining. Through the cavity at the center of the inside mandrel of the cross-head coating die, a copper pipe 8 mm in outside diameter kept at a surface temperature of 25° C. was supplied at a rate of 2 m/min. in the same direction as the extrusion of the mixture.

The application of the mixture to the copper pipe was effected in the die interior 5 mm inwardly from the discharge outlet of the die. The mixture applied to the pipe in the die was extruded in an integrally joined form through the discharge outlet of the die 11 mm in outside diameter into the atmosphere. Upon exposure to the atmospheric pressure, the mixture began to foam.

At this point, cooling air kept at 15° C. from a slitted air ring 70 mm in diameter and cooling water kept at 10° C. from a perforated ring 80 mm in diameter, both disposed adjacent the discharge outlet of the die, were blown against the outer boundary of the foam to inhibit outward inflation of the polyethylene foam and ensure uniform union of the copper pipe and the polyethylene foam. Consequently, there was obtained a polyethylene foam-coated pipe.

The polyethylene foam-coated pipe thus produced was found to possess a uniform skin layer 0.15 mm in thickness along the interface between the copper pipe and the polyethylene foam coating. The polyethylene foam having a density of 0.13 g/cm$^3$ (representing an expansion ratio of 7.2) and a coating thickness of 7 mm was found to be held in tight contact with the copper pipe through the medium of said skin layer. When a cut was inserted with a knife in the coating layer of the polyethylene foam-coated pipe through the entire depth and one portion of the coating layer was pulled out of the copper pipe, it was removed very easily and absolutely no part of the foamed resin was seen to remain sticking to the surface of the copper pipe. The pipe, thus, was found to enjoy high workability.

EXAMPLE 5

The procedure of Example 4 was faithfully repeated, except the copper pipe as a hollow core material was substituted by a Nylon pipe 8 mm in outside diameter and kept at a surface temperature of 30° C. Consequently, there was obtained a polyethylene foam-coated pipe.

The polyethylene foam-coated pipe thus produced was found to possess a uniform skin layer of polyethylene resin 0.1 mm in thickness along the interface between the foam layer and the Nylon pipe. The polyethylene foam coating having a density of 0.11 g/cm$^3$ (representing an expansion ratio of 8.5) and a coating thickness of 8 mm was found to be held in tight contact with the Nylon pipe through the medium of said skin layer. When a cut was inserted with a knife in the coating layer of the polyethylene foam-coated pipe through the entire depth and one portion of the coating layer was pulled out of the Nylon pipe, it was removed very easily and absolutely no part of the foamed resin was seen to remain sticking to the surface of the Nylon pipe. The pipe, thus, was shown to enjoy high workability.

To demonstrate the operation and effect of the method of this invention, the procedures of working examples of this invention were repeated by using the same extrusion foaming system, except the cooling of the surface of the polyethylene foam was omitted as described in the following comparison example.

COMPARISON EXAMPLE

By following the procedure of Example 2, extrusion coating was carried out while the blowing of cooling air to the outer boundary of the foam through the air ring disposed adjacent the outlet of the die was suspended. The polyethylene foam-coated pipe was found to have an uneven surface with the outside diameter varying in the range of from 34 mm to 39 mm. The foamed coating had its inside diameter also varying in the range of from 18 mm to 19 mm (compared with the outside diameter 15.88 mm of the copper pipe). Thus, the foamed coating was not held in tight contact with the copper pipe. The product was found rejectable because it suffered the copper pipe to slide freely inside the polyethylene foam coating.

What is claimed is:

1. In a method for the continuous extrusion coating by the use of a coating die of a hollow core material with a highly expandable polyolefin resin composition containing a volatile organic liquid blowing agent, the improvement comprising externally, cooling the outer surface of said extruded molten mass of expandable polyolefin resin, at the point at which said molten mass begins to foam, by by contacting said surface with a cooling gas or water to allow the pressure of foaming to be exerted inwardly and also to cause the growth of foam to proceed in the direction of the internal core for thereby enabling the polyolefin foam to adhere fast to the hollow core and giving rise to a coating having a smooth surface condition, wherein said expanded polyolefin foam has an expansion ratio of not less than 3.

2. The method according to claim 1, comprising keeping the surface temperature of the hollow core material being continuously supplied at a level below the softening point of the expandable polyolefin resin being extruded through the coating die and thereby allowing a uniform skin layer to be formed of said polyolefin resin along the interface between the core material and the molten mass when they are brought into mutual contact, whereby said uniform skin layer maintains fast adhesion of the foamed coating to the core material and yet permits ready release of the foamed coating from the core material.

3. The method according to claim 2, wherein the polyolefin resin is a low-density polyethylene having a density of not more than 0.930 g/cc.

4. The method according to claim 2, wherein the polyolefin resin is a mixture consisting of from 30 to 90% by weight of a low-density polyethylene having a density of not more than 0.930 g/cc and 70 to 10% by weight of a high-density polyethylene having a density of not less than 0.940 g/cc.

5. The method according to claim 2, wherein the hollow core material is made of a metallic or synthetic resin substance.

6. The method of claim 1 comprising applying the expandable polyolefin resin coating to the hollow core as the resin leaves the die.

* * * * *